Oct. 21, 1969     B. N. SVENSON ET AL     3,473,561
CHECK VALVE WITH SUPPORTED CLOSURE MEMBER
Filed March 29, 1966     5 Sheets-Sheet 1
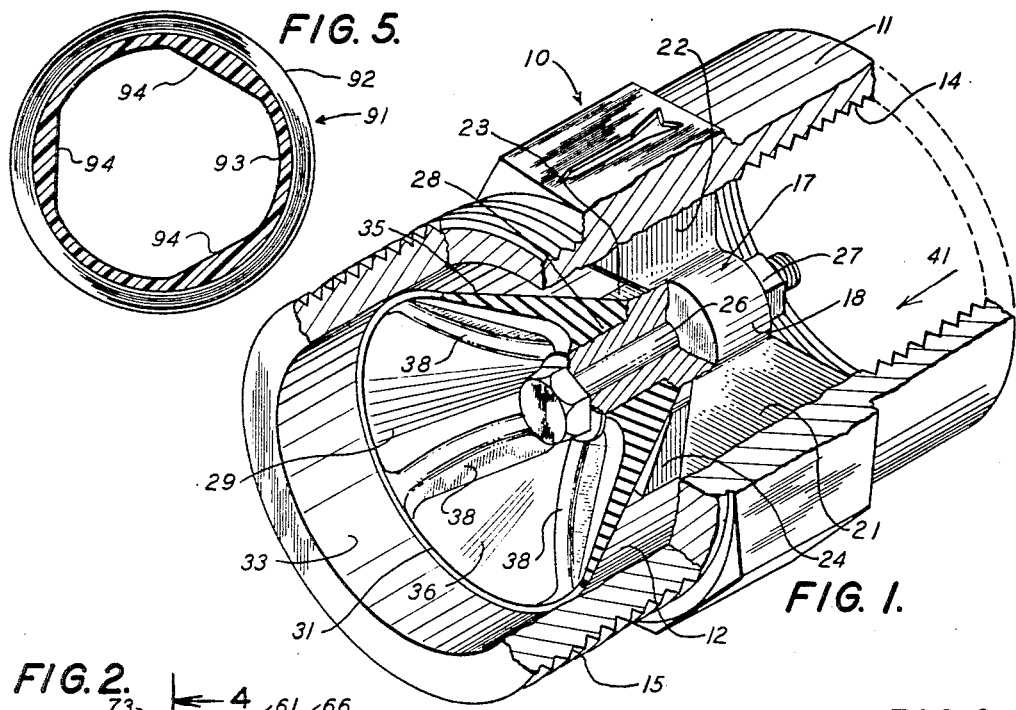
FIG. 5.
FIG. 1.
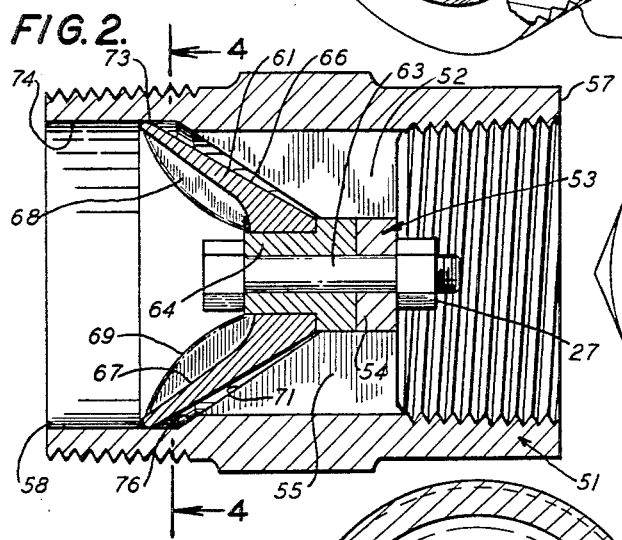
FIG. 2.
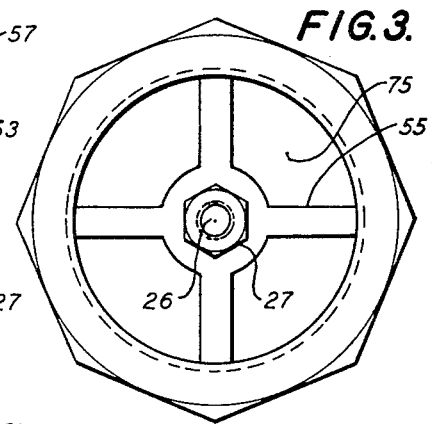
FIG. 3.
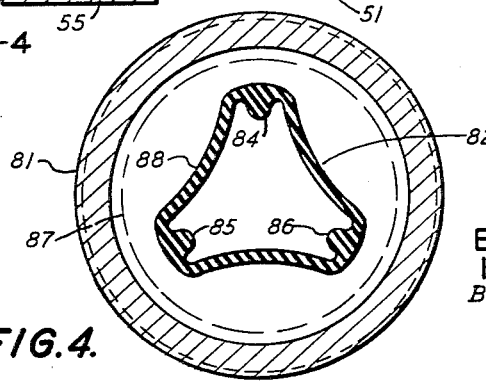
FIG. 4.
INVENTORS:
BERT N. SVENSON
IVAR L. SVENSSON
BY
W. J. Gribble
ATTORNEY Oct. 21, 1969  B. N. SVENSON ET AL  3,473,561
CHECK VALVE WITH SUPPORTED CLOSURE MEMBER
Filed March 29, 1966  5 Sheets-Sheet 2

INVENTORS:
BERT N. SVENSON
IVAR L. SVENSSON
BY
W. J. Gribble
ATTORNEY

INVENTORS:
BERT N. SVENSON
IVAR L. SVENSSON
BY
W. J. Gribble
ATTORNEY

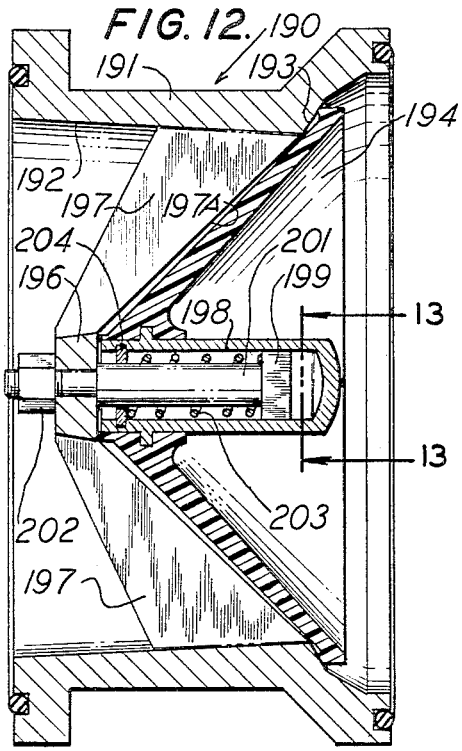
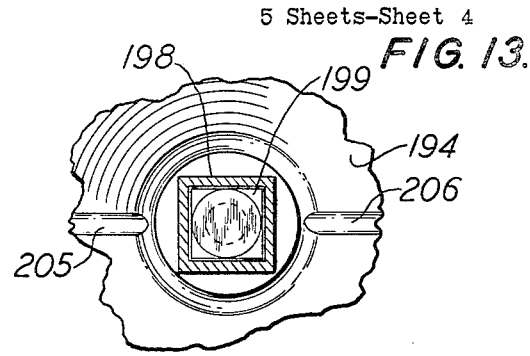
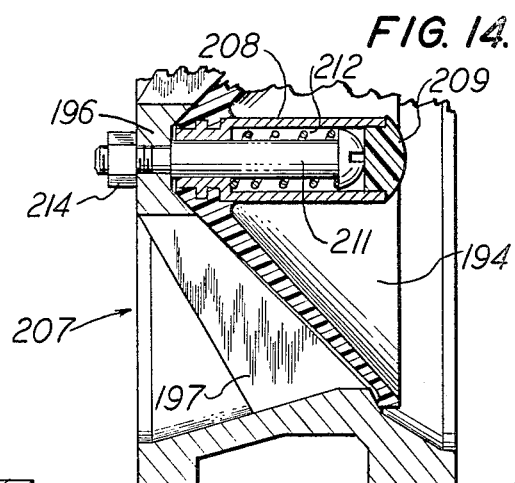
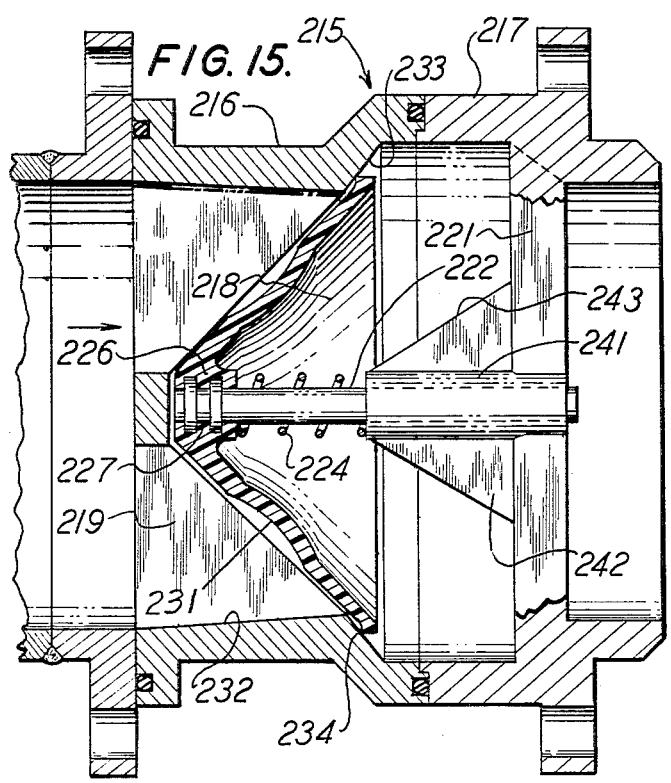
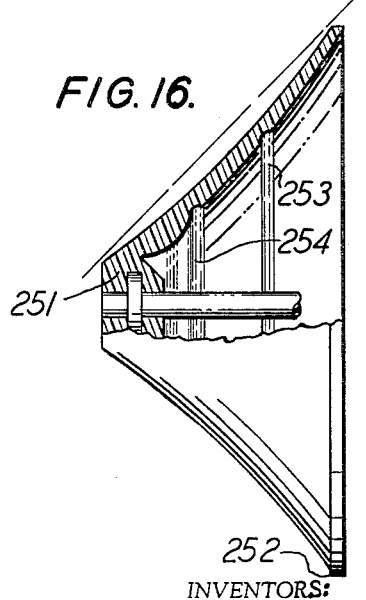
INVENTORS:
BERT N. SVENSON
IVAR L. SVENSSON

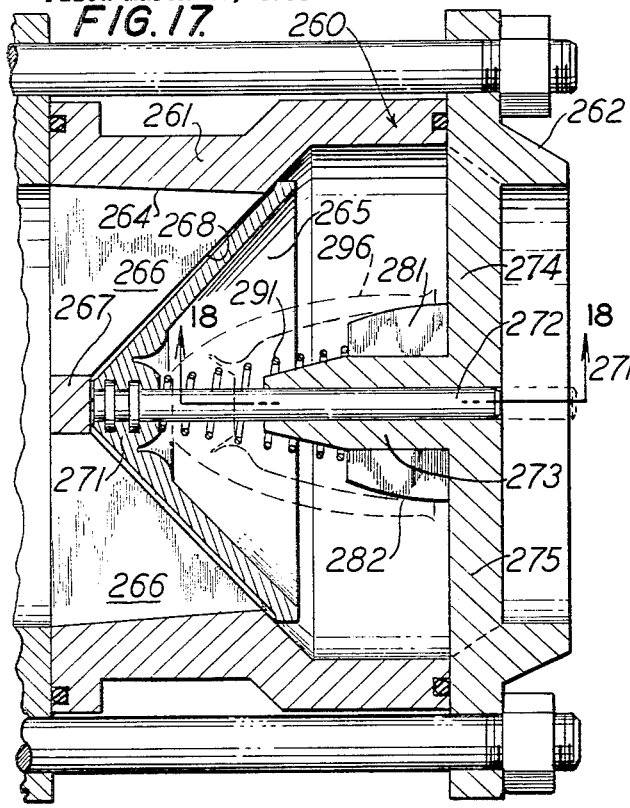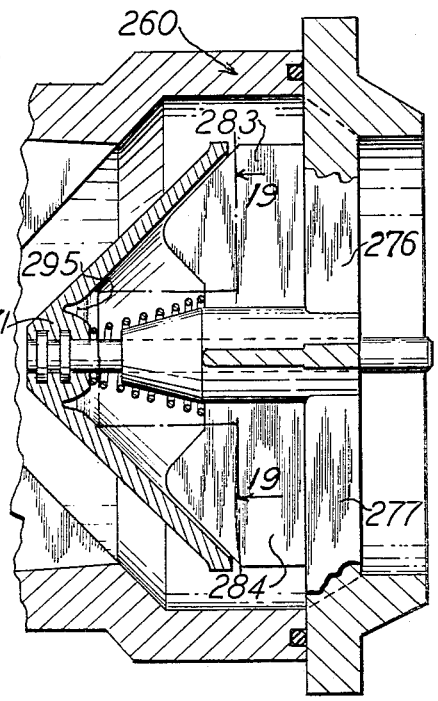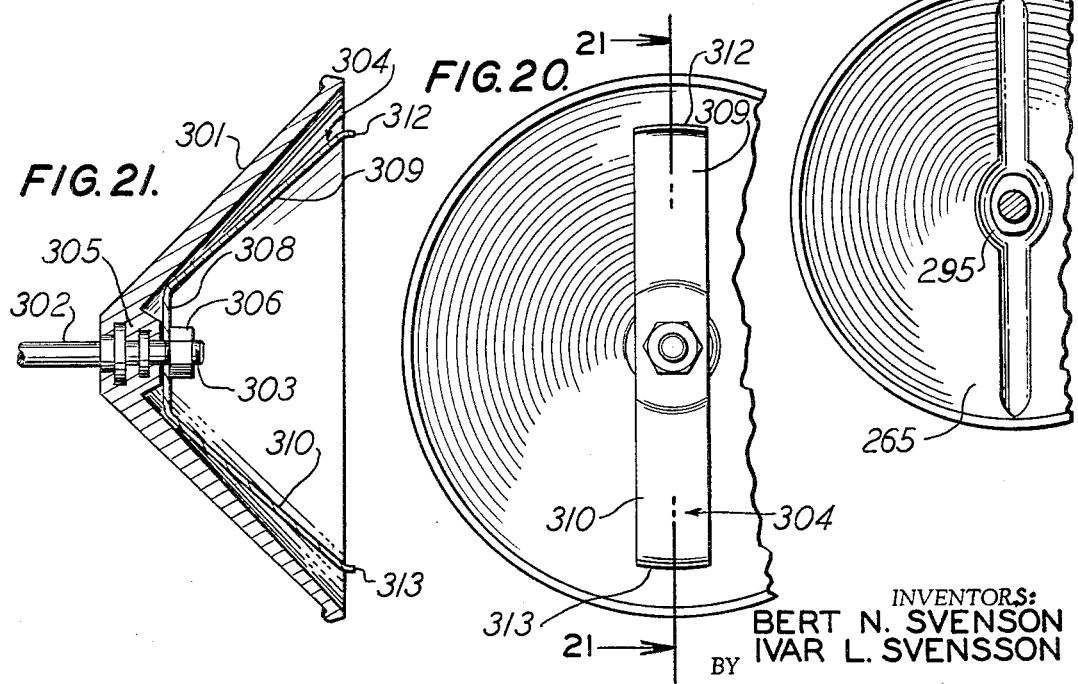

3,473,561
CHECK VALVE WITH SUPPORTED CLOSURE MEMBER
Bert N. Svenson, 10747 Spry St., Norwalk, Calif. 90650, and Ivar L. Svensson, Malavagen, Bjarnum, Sweden
Continuation-in-part of application Ser. No. 379,593, July 1, 1964. This application Mar. 29, 1966, Ser. No. 538,403
Int. Cl. F16k *15/00, 17/00, 21/04*
U.S. Cl. 137—525       9 Claims

ABSTRACT OF THE DISCLOSURE

A unidirectional valve for large volume flow of gases which may contain granules. The valve has a cylindrical body within which a multi-vaned spider supports a conical valve closure member of resilient material. The member is predisposed to "fold" under proper fluid flow by member walls that vary from place to place in thickness, strength or in position relative to spider vanes that affect flow. The member is supported under back pressure by the spider vanes, which are shaped to support the member. Destructive "flutter" of the closure member under fluid flow is inhibited by uneven variations in member wall thickness, wall strength, and fluid flow pattern against the member, as well as by downstream contact ribs against which folded portions of the closure member may reside.

---

This application is a continuation-in-part of our copending U.S. application Serial No. 379,593, filed July 1, 1964, now abandoned, and entitled "Check Valve With Supported Resilient Closure Member."

Check valves used in flow lines for fluids and granular solids are often damaged by destruction of the resilient closure member. The cause of damage is not necessarily inherent in the member material, such as silicone rubber, but rather is caused because the closure member is not properly backed or because of member harmonic vibrations or "flutter."

Conventionally, the closure members of many check valves are conical, with the cone expanding in the direction of material flow. A portion of the cone is normally expanded against a valve seat by the back pressure loading to seal the line. Under extreme back pressure conditions the cone may be completely reversed by excessive pressure.

The major periphery of a conventional conical flexible closure member is the first portion of the cone to be distorted by material flow when pressure is in the open valve direction. Distortion normally takes the form of uniform closure member compression. The major periphery of the member vibrates because of the imbalance between the line pressure and the resistance to compression of the member material. Such continuous vibration or "flutter" at the same frequency soon destroys the closure member.

We have invented a unidirectional or check valve for use in a flow line that combines a resilient or flexible closure member with valve and valve seat construction such that the closure member is supported against back pressure, closes efficiently, is self-cleaning, and which defeats closure member destruction due to flutter. The invention contemplates a check valve adapted for positioning in a flow line and comprising a preferably conical flexible closure member suspended from a valve spider within a flow passage in a valve body. Preferably a valve seat or seats defined by the inner periphery of the flow passage affords sealing contact to the closure member. Preferably the configuration of the seat and those of the member and the spider vanes are such that pressure fluctuations cause closure member "wiping" of the valve seat.

The closure member wall has exterior and interior surfaces extending outwardly from the spider in the direction of normal line flow. The space between exterior and interior surfaces may vary circumferentially or the wall may be interiorly or exteriorly reinforced such that the resistance to compression of the wall differs in various areas of the member.

The closure member may be fixedly held by the spider mount or may be mounted by means including a resilient component such that the member may move along the flow axis of the valve body, in opposition to the resilient component, in the direction of line flow. This freedom of movement permits valve passage configurations whereby the pressure resistance of the valve section is reduced.

The valve body may be threaded or flanged at its inlet and outlet ends to combine with different flow line connections. Threads at both ends may be internal or, alternatively, may be external. The valve body may be split transversely of the flow passage and secured together by bolts, and easily thus separated for inspection or any necessary maintenance.

These and other advantages of the invention are apparent from the following detailed description and drawing wherein like parts bear like numbers and in which:

FIG. 1 is a perspective view, partly in section, of an embodiment of the invention;

FIG. 2 is a longitudinal sectional elevation of a preferred embodiment of the invention;

FIG. 3 is an end elevation of the embodiment of FIG. 2;

FIG. 4 is a sectional elevation of an alternate valve in accordance with the invention taken along a line similar to line 4—4 of FIG. 2 and showing closure member configuration during normal line flow;

FIG. 5 is a transverse sectional elevation showing a further alternate embodiment of a closure member;

FIG. 12 is a sectional elevation of a further alternate embodiment of the invention;

FIG. 13 is a fragmentary sectional elevation taken along line 13—13 of FIG. 12;

FIG. 14 is a fragmentary sectional elevation of a modification of the embodiment of FIG. 12;

FIG. 15 is a sectional elevation of a further alternate embodiment of the invention wherein the closure member is externally supported;

FIG. 16 is a side elevation partly broken away, of a further alternate embodiment of a closure member adapted for combination with the valve embodiment of FIG. 15;

FIG. 17 illustrates in sectional elevation a further alternate embodiment of the invention;

FIG. 18 is a sectional view taken along line 18—18 of FIG. 17;

FIG. 19 is a fragmentary elevation of the closure member central core taken along line 19—19 of FIG. 18;

FIG. 20 is a fragmentary elevational view of an externally reinforced closure member; and FIG. 21 is a sectional elevation taken along line 21—21 of FIG. 20.

Figure 6:
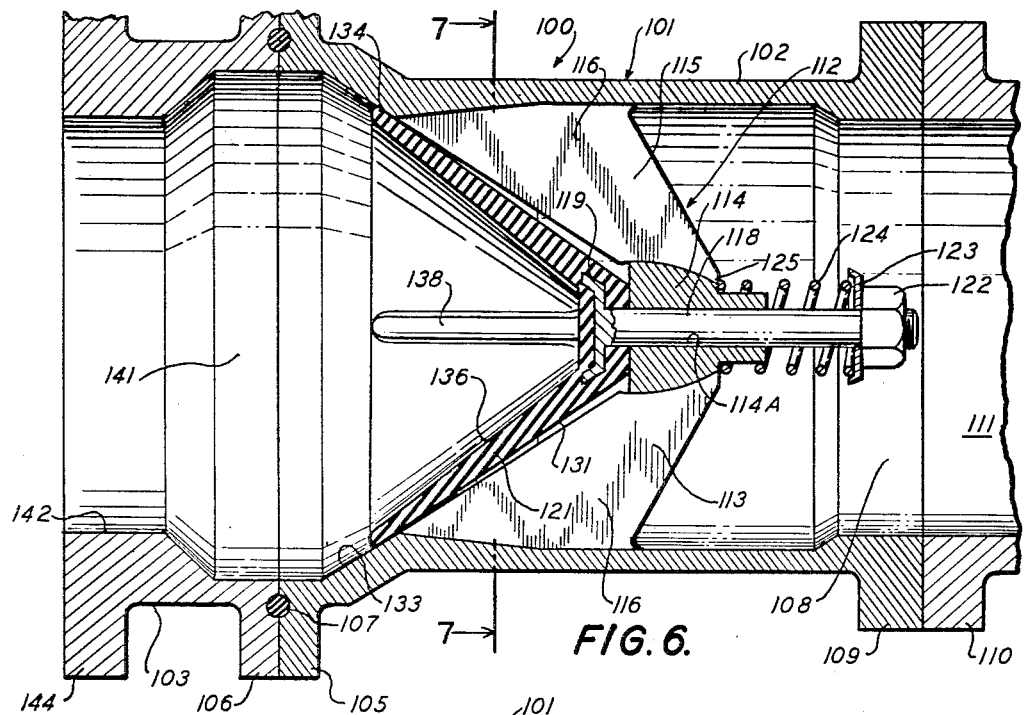
FIG. 6 is a longitudinal sectional elevation of a still further alternate embodiment of the invention.

In FIG. 1 a unidirectional or check valve 10 has a valve body 11 through which a flow passage 12 extends from inlet and to outlet end. The inlet end 14 of the valve is internally threaded while the outlet end 15 of the valve body is externally threaded. The inlet and outlet ends may be modified in accordance with the type of flow line with which the valve body is to be combined.

A support spider 17 has a hub 18 and transverse vanes 21, 22, 23, 24. The hub is located centrally of the valve body and may be formed integrally therewith. Each of the vanes has a thin transverse section and thereby they together define interstices of large cross-sectional areas through which materials may flow without undue resistance.

A hexagonal headed bolt 26 is secured within hub 18 by a nut 27. Bolt 26 supports a central core 28 of a substantially conical and flexible hollow closure member 29 so that the major periphery 31 of the member is concentric with the wall of flow passage 12. The major diameter of the closure member is commensurate with the diameter of a cylindrical outlet chamber 33 of flow passage 12. The closure member has substantially conical outer and interior surfaces 35, 36, respectively. The interior surface is irregular in that the space between the exterior and interior surfaces of the member increases at circumferential intervals to form a plurality of radial ribs 38.

The ribs vary the wall strength of the closure member. Material flow in the direction of arrow 41 passes through the interstices between spider vanes 21–24 and impinges upon outer surface 35 of the closure member. Downstream motion of the closure member is precluded by its fastening to hub 18. Therefore, response to the impinging pressure in the direction of arrow 41 is compression of the closure member. More deformation due to compression takes place in the thinner closure member wall portions between the ribs 38. Therefore, the outer configuration of the closure member becomes uneven, preventing harmonic vibration of the sealing edge. The forces impinging upon the closure member result in a varying response pattern that precludes establishment of a fixed vibratory rate. Therefore, the closure member is not subject to the destructive forces conventionally encountered in valves of this type. Additionally, vanes 21–24 are shaped to support the closure member against destructive deformation under back pressure.

FIGS. 2 and 3 illustrate an alternate embodiment of the invention wherein a valve body 51 encloses a flow passage 52. A support spider 53 centrally located in the passage has a hub 54 and a plurality of similar spaced radial vanes 55.

An inlet portion 57 of the valve body has internal threads and an outlet portion 58 of the valve body has exterior threads, providing for incorporation of the valve body into a flow line (not shown).

A resilient or flexible closure member 61, substantially similar to closure member 29 of the embodiment of FIG. 1, is supported by hub 54 and attached thereto by a conventional bolt 63 passing through a spindle 64 about which the closure member is molded. The distance between the exterior and interior surfaces 66, 67 which define the wall of the closure member varies at points on the circumference, as at ribs 68, 69.

Each vane 55 of spider 53 has a downstream sloping surface 71 diverging outwardly from the hub and terminating at the central periphery of flow passage 52. The angle of divergence of the vane surfaces varies slightly from the normal or relaxed angle of exterior surface 66 of the closure member. Normally, under "no-pressure" conditions a peripheral sealing edge 73 of the closure member contacts the wall of an outlet chamber 74 of the flow passage in sealing relationship. The pressure of material flow from the inlet end of the valve tends to deform the closure member and its sealing edge 73 to permit flow thereabout. Such flow takes place from the inlet end through interstices 75, between vanes 55 of the spider and around the exterior of the compressed closure member.

If flow reverses, interior wall 67 of the closure member is thrust rightwardly, as viewed in FIG. 2, such that sealing edge 73 of the closure member presses against the valving periphery of outlet chamber 74 to form a tight seal checking flow. If the back pressure is extreme, the closure member is deformed sufficiently to contact, in sealing relationship, the tapering second valving surface 76, which forms a conical transition section between the outlet chamber and the median portion of flow passage 52. The second valving surface and vane surfaces 71 are substantially aligned so that exterior surface 66 is backed up by the vane surfaces at several places to preclude involution of the closure member.

The extreme major peripheral edge 73 of the closure member normally contacts chamber 74 at a point downstream from second valving surface 76. Under back pressure conditions edge 73 migrates toward the second valving surface. Any material particles, whether of the material being transported or of foreign substances, tend to be wiped from the closure member sealing edge by migration of the closure member toward the second valving surface.

The embodiments of FIGS. 1 and 2 show closure members each having an even number of thickened wall ribs. In FIG. 4 an alternate closure member 82 is shown within a valve body 51. The closure member is flexible and has three evenly spaced inner ribs 84, 85, 86. A broken line 87 denotes the normal circumference of the closure member at section line 4—4 of FIG. 2. The normally conical outer surface 88 of the closure member is deformed by line flow into the three-sided configuration of FIG. 4. The closure member periphery is deformed, resultant forces within the member are nonuniform, and harmonic vibrations cannot become established by repetitive constant vibrations of the closure member wall.

FIG. 5 illustrates in transverse cross section a further alternate closure member in accordance with the invention. A closure member 91 in relaxed state has a conical outer surface 92 and a substantially concentric inner surface 93. Inner surface 93 varies in its distance from outer surface 92 at various places on its circumference. The surface variations in the embodiment of FIG. 5 take the form in cross section of short chords 94 across an arc of surface 93. The response of closure member 91 to line flow from the inlet side of the unidirectional valve is similar to that shown for FIG. 4 in that the compressive forces distort the closure member nonuniformly with respect to the central axis of the closure member.

Figure 7:
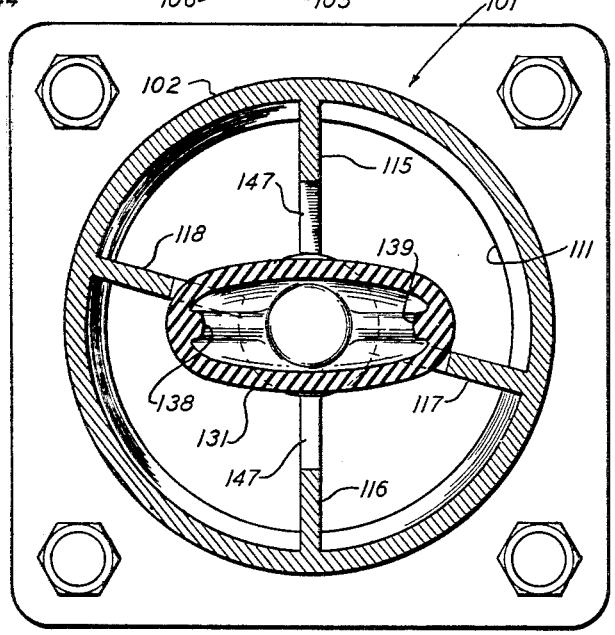
FIG. 7 is a sectional elevation taken along line 7—7 of FIG. 6.

In FIGS. 6 and 7 a further alternate embodiment of the unidirectional valve of the invention is shown. A valve 100 has a valve body 101 having an intake portion 102 and an outlet portion 103. The portions are joined to each other at their respective flanged connections 105, 106. A sealing gasket 107 is seated in the mating surfaces of the flanges. Intake end 108 of valve body portion 102 has a flange 109 for connection with a like flange 110 of a flow line pipe 111. Body portion 102 has a stepped flow passage 112 in which a spider 113 resides. The spider has a central hub 114 and a plurality of support vanes 115, 116, 117, 118 (see FIG. 7).

Hub 114 has a central bore 114A through which a shaft 118 projects. A cup 119 on the end of the shaft protruding from the hub toward the valve body outlet supports a substantially conical closure member 121 of a flexible material, such as silicone rubber, molded about the cup. The opposite end of the shaft is threaded. A nut 122 on the shaft acts as a stop for a spring retainer 123 encircling the shaft. A helical compression spring 124 around the shaft bears against the spring retainer and a shoulder 125 on the spider hub. The spring biases the shaft in a direction opposite to the normal flow of material through the valve.

The resilient closure member has a substantially conical exterior surface 131 defining a cone increasing in diameter from hub 114 outwardly toward a similarly oriented frusto-conical valving surface 133 of the valve body. An extreme edge 134 of the exterior surface seats in sealing relationship against surface 133.

An interior surface 136 of the closure member has an irregular conical configuration which, with surface 131, defines the member wall. The space between exterior surface 131 and interior surface 136 varies at circumferentially separated lines along the closure member, resulting in radial ribs 138, 139. The pitch of the exterior and interior surfaces may also vary so that the wall thickness defined by the two surfaces is less at the major diameter of the member.

At the juncture of valve body portions 102 and 103 is a cylindrical chamber 141 common to both portions. The diameter of chamber 141 is greater than the major diameter of the closure member when the closure member is in a relaxed state. Chamber 141 connects to a smaller passage 142 in valve portion 103. A flange 144 at the exit of passage 142 affords means for connecting the valve body to a flow line.

In operation, valve 100 receives material flow from line 111. Thus the path of flow is from right to left in FIG. 6. At a pressure determined by spring 124, closure member 121 shifts leftwardly, extending shaft 118 from hub 114 and displacing closure member sealing edge 134 from valving surface 133. Material, such as fluids or finely divided solids, may flow about the closure member into chambers 141 and 142 and thence into the flow line.

As the flow volume and pressure rise, closure member 121 tends to compress because of the forces impinging upon its exterior surface 131. If the pressure is great enough spring 124 is completely compressed and closure member 121 is distorted into the cross-sectional shape similar to that shown in FIG. 7. The distorted configuration of the member approximates an elongate oval, as the thinner or unreinforced wall sections are more easily compressed toward the central axis of the member. Chamber 141 has a diameter great enough to accommodate the elongation. As can be seen in FIG. 7, the flow area about the closure member is considerable when the closure member is thus deformed.

The embodiment of FIGS. 6 and 7 is a check valve wherein the flow in a desired direction is only slightly impeded by the components of the valve, such as the thin hub vanes, which offer little resistance to material flow.

The vanes as shown in FIG. 7 are unsymmetrically disposed about the hub. The object of such disposition is to further combat "flutter" which often results in the destruction of the flexible closure member. The flow pattern through the unsymmetrically disposed vanes inhibits regular deformation of the closure member, further inhibiting harmonic vibration of the closure member.

Sealing edge 134 of the closure member tends to wipe against valving surfaces 133 of the valve body, both when the member displaces from hub 114 and when back pressure compresses the closure member rearwardly into support contact with support surface 147 of each vane. The wiping motion dislodges any particles residing on the valving surface or the sealing surface of the closure member, thus effecting better sealing.

Figure 8:
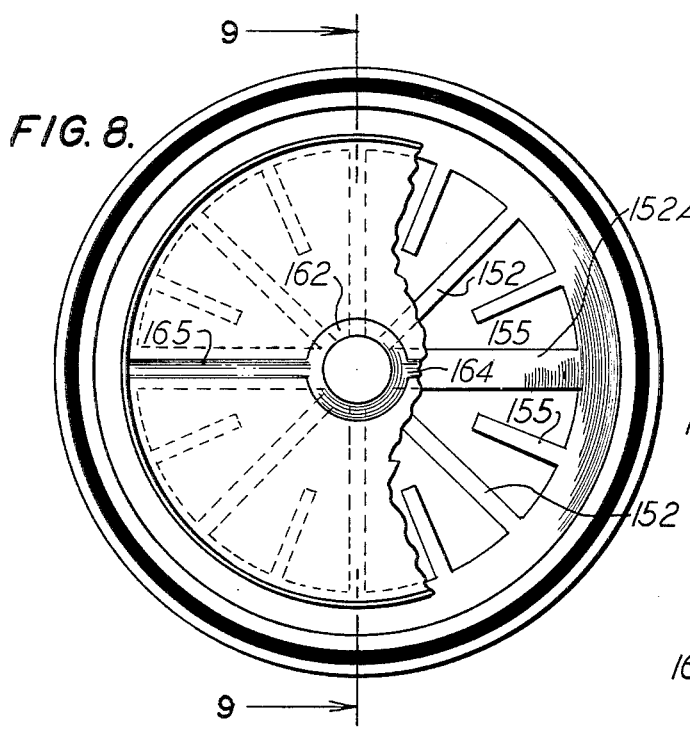
FIG. 8 is an elevational view, with the closure member partly broken away, of an alternate embodiment of the invention.
Figure 9:
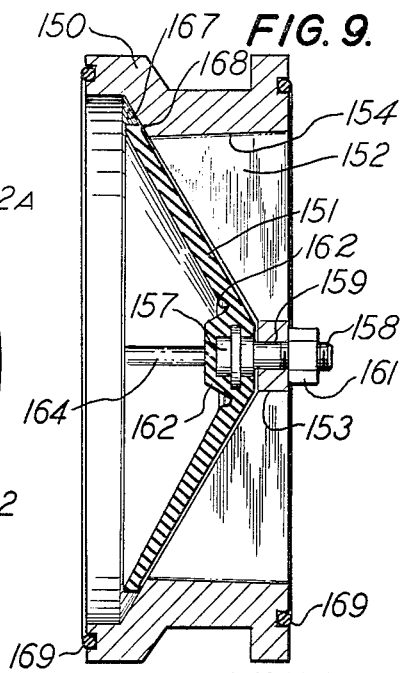
FIG. 9 is a sectional elevation taken along line 9—9 of FIG. 8.

The embodiment of FIGS. 8 and 9 is adapted for insertion into a flow line between flanged coupling members which are drawn together by bolts. A valve body 150 is relatively short axially because the angle of the cone which defines the closure member 151 is great. As in previous embodiments, a plurality of vanes 152 support a spider hub 153 within the valve body flow passage 154. A second plurality of stub vanes 155 extend from the wall of flow passage 154 and terminate short of the hub. Support is thus afforded to the closure member against back pressure without restricting fluid flow in the vicinity of the hub.

Closure member 151 is molded about a flanged boss 157, from which a threaded shank 158 protrudes. The threaded shank passes through an axial hole 159 in the spider hub and is secured to the hub by conventional nut 161, restricting axial movement of a central portion 162 of the closure member. Thus, the amount of fluid flow through the valve at maximum is largely determined by the configuration which the closure member assumes under maximum flow conditions. In order to induce a collapsed or folded pattern similar to that shown in FIG. 7, the closure member has an annular groove 164 around the central portion, and the thickness of the wall of the closure member is diminished in a narrow area defined by aligned radial grooves 164, 165. Since the closure member is thus predisposed to fold along this line, it achieves the folded configuration shown in FIG. 7.

In order to compensate for the thinned wall, a radial vane 152A is thickened and the closure member is disposed so that the radial grooves align with the thick vane which diverts more flow against those parts of the member remote from the radial grooves, further inducing closure member folding.

Flow passage 154 opens into a frusto-conical valve seat 167. A circumferential lip 168 at the extreme edge of the closure member contacts the valve seat. Under back pressure lip 168 is forced along the surface of the valve seat in a wiping action which cleans that surface and thus affords a consistent seal.

Rubber O-rings 169 seal between line components when the valve body is clamped into position in the flow line.

Figure 10:
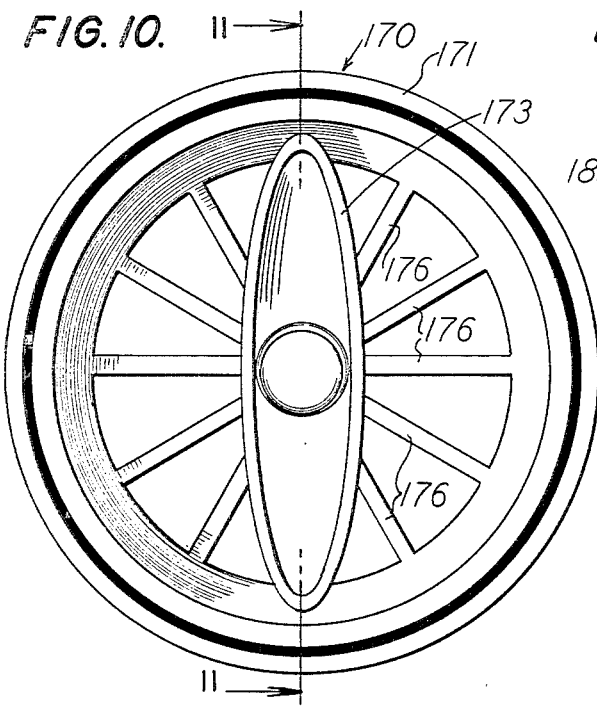
FIG. 10 is an end elevation of a further alternate embodiment showing the closure member under normal line flow.
Figure 11:
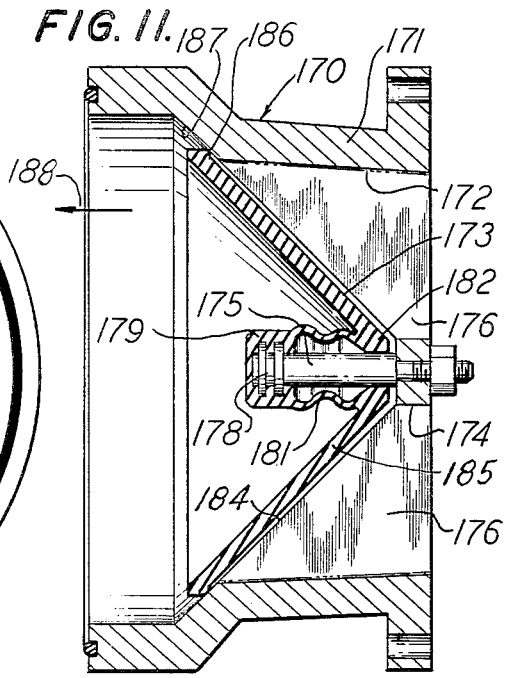
FIG. 11 is a sectional elevation taken along line 11—11 of FIG. 10.

FIGS. 10 and 11 illustrate an alternate embodiment of the invention in which a check valve 170 comprises a substantially cylindrical valve body 171 having a flow passage 172 in which a hollow conical closure member 173 resides. A spider hub 174 supports a threaded shaft 175 which holds the closure member. A plurality of flat radial vanes 176 support the spider hub centrally of flow passage 172.

The closure member is a substantially conical resilient hollow body into which threaded shaft 175 protrudes. The shaft terminates in a flanged portion 178 upon which a retaining core 179 is molded. A bellows section 181 connects the core with a central portion 182 of the closure member cone.

The bellows section acts as a resilient connector opposing motion of the closure member along shaft 175. The bellows section returns the closure member to the closed orientation of FIG. 11 when downstream pressure subsides. A downstream face 184 of each vane supports the closure member against back pressure. In its relaxed state the closure member wall 185 is spaced from the face of the vanes. When the back pressure mounts, the wall 185 is pressed against the vane faces. This causes a slight distortion of the closure member, wiping protruding lip 186 of the closure member along a frusto-conical valve seat 187 of the valve body.

When delivery flow in the direction of the arrow 188 takes place, the closure member moves downstream along shaft 175 and assumes the folded configuration shown in FIG. 10, elongating into the larger chamber at the end of valve seat 187. Line flow is largely unimpeded through the valve due to the open construction of the spider and vanes and the folded position of the normally conical closure member under high pressure.

The embodiment of FIGS. 12 and 13 is axially compact like the embodiment of FIG. 10. Compactness is achieved by mounting the resilient closure member return means within the hollow closure member cone. In FIG. 12 a one-way or check valve 190 has a substantially cylindrical valve body 191. A flow passage 192 in the body terminates in a frusto-conical valve seat 193. A substantially conical resilient hollow closure member 194 resides largely within the flow chamber. A spider hub 196 is suspended centrally of the flow chamber by a plurality of similar radial vanes 197. The vanes also support the closure member under back pressure conditions. The normal angle of deviation of the conical closure member wall differs from the angle of the front faces 197A of the vanes so as to induce member deformation to cause a wiping motion of the end of the closure member against the valve seat under fluctuations in line pressure.

The closure member is molded upon a hollow square arbor 198. The arbor fits in slip relationship about a squared head 199 on a threaded bolt 201 fixed in the spider hub by a nut 202. A compression spring 203 within the arbor is confined between a sliding washer 204 and the under side of the square head.

Under normal flow pressure, the closure member moves away from the vanes as the arbor moves along bolt 201 against the pressure of the spring. Since the area of the valve seat is greater than that of the flow passage, movement of the member into the former increases the cross-sectional area open for flow within the valve body.

As can be seen in FIG. 13, closure member 194 has aligned radial grooves 205, 206. These grooves predispose the closure member to fold along this line under pressure and assume the configuration shown in FIG. 10. The squared arbor is adapted to retain the closure member in proper orientation with respect to the vanes such that the grooves 205, 206 may be directly backed against the face 197A of a vane. Obviously grooves and ribs of varying distribution and configuration may be used to predispose the cone of the closure member to fold about its axis in different configurations depending upon the desired fluid flow pattern.

In FIG. 14 a check valve 207 substantially identical to the valve of FIG. 12 has a cylindrical arbor 208 about which the central portion of the closure member is molded. The arbor is open at its downstream end and sealed by a resilient plug 209. The plug may be removed to give access to a slotted screw 211 about which a spring 212 is wound. Whereas the embodiment of FIG. 12 was adjustable by holding the squared arbor in a conventional wrench while nut 214 is manipulated, the embodiment of FIG. 14 may be adjusted by removing plug 209 and inserting a screw driver into the slot of screw 211.

The closure member 194 of the embodiment of FIG. 14 may have radial grooves or be shaped in the manner shown in any of the previous embodiments in order to achieve a nonuniform response to pressure upon the closure member such that continued fluid flow does not induce flutter.

In FIG. 15 a check valve 215 comprises two valve body sections 216 and 217. Section 216 largely contains a resilient closure member 218 and its plurality of similar back-up vanes 220. Second section 217 contains a support spider 221 for a shaft 222 along the axis of which the closure member is displaced by sufficient fluid pressure. Movement of the closure member is opposed by a compression spring 224.

A central portion 226 of the closure member is molded about a flanged end 227 of shaft 222. The closure member is largely conical in configuration, being hollow and relatively thin-walled. The wall contains a circumferential recess 231.

First body section 216 has a substantially cylindrical flow chamber 232 connecting with a frusto-conical valve seat 233. A peripheral lip 234 of the closure member seats against the valve seat. Under back pressure conditions, recess 231 flattens against the downstream faces of the vanes, causing downstream elongation of the closure member, wiping lip 234 against the valve seat surface. Thus the valve of FIG. 15 has a self-cleaning propensity.

The support spider has a hub 241 in which shaft 222 is slidable. The hub has a pair of diametrically opposed ribs 242, 243. Under conditions of high pressure within the line, the inner wall of the closure member approaches and finally touches the sloping surfaces of the ribs. The ribs thereby act to inhibit further motion of the opposed closure member wall zones which contact them. This in turn makes nonuniform the response of the closure member to the flow forces acting upon it. Destructive flutter is thereby inhibited in two fashions: nonuniform configuration of the closure member and a vibration damping action by the ribs.

In FIG. 16 the illustrated resilient closure member is substantially conical in shape. However, the wall which defines the closure member does not have a straight radial configuration but rather is concave in cross-section from central portion 251 to outer lip 252. Therefore, if the support vane has a straight face, there is outward elongation of the conical closure member under increasing back pressure. Elongation of the conical member results in a wiping action of lip 252 against the valve surface in a valve body similar to that of FIG. 15.

The closure member may have discontinuous annular grooves 253, 254 to induce particular distortion patterns in the closure member under conditions of high flow.

FIGS. 17, 18 and 19 illustrate an embodiment of the invention wherein the closure member is resiliently mounted and wherein the closure member is exteriorly reinforced during certain flow conditions. A check valve 260 has a first body section 261 and a second body section 262. Each of these sections is adapted for conventional joining to flow lines such as by clamping or by continuous joint welding. Body section 261 has a flow chamber 264 in which a hollow cone resilient closure member 265 resides. A plurality of spaced vanes 266 extend from the wall of the chamber to a spider hub 267. Each vane has a front face 268 which supports the closure member against excessive back pressure forces. A central portion 271 of the closure member is molded about the flanged end of a shaft 272. The shaft is supported by a protruding hub 273 which is axially located within the line by radial arms 274, 275, 276 and 277 of second body section 262. Diametrically opposed short vanes 281, 282 extend from hub 273 (FIG. 17). Radially longer diametrically opposed vanes 283, 284 extend from the hub at right angles to the short vanes (FIG. 18).

Under normal line pressure closure member 265 moves downstream as shaft 272 is displaced within the hub 273 against the pressure of resilient holding means or concentric spring 291. Such disposition is shown in FIG. 18 wherein the inner surface of the closure member contacts long vanes 283, 284. The closure member has a deep groove 295 adjacent central portion 271 of the closure member. As can be seen from FIG. 19, groove 295 makes it easier for the closure member to bend along a line opposed to long vanes 283, 284. Thus those zones of the closure member periphery displaced 90° from the long ribs are disposed to collapse further and thus contact the short vanes 281, 282, as shown in the doted configuration 296 of FIG. 17. Therefore, the embodiment of FIGS. 17–19 exteriorly reinforces the closure member after its displacement against the resilient holding means. The vanes thus dispose the closure member in a particular collapsed for folded pattern and at the same time tend to damp any member vibrational effects due to stream flow.

Much the same effect may be achieved by combining within a valve body the closure member 301 shown in FIGS. 20 and 21, wherein the closure member comprises a hollow, substantially conical, resilient body molded about a flanged shaft 302 which terminates within the cone in a threaded portion 303. An exterior support bracket 304 is held to the shaft adjacent central portion 305 of the closure member by a nut 306. The bracket has a transverse central portion 308 and two diverging arms 309, 310 which extend within the cone from the transverse portion at an angle slightly less than the angle of the divergence of the cone. As can be seen from FIG. 20, the exterior bracket is narrow compared to the diameter of the cone. Thus, as the closure member folds or deforms under the pressure of the fluid flow through the valve, that peripheral portion of the closure member remote from the ends 312, 313 of the bracket can distort closer to the axis of the shaft than can that portion of the periphery which encounters the bracket arms 309, 310. Therefore, even though the wall defining the closure member is uniform in terms of thickness and strength, the exterior support imposes a nonuniform configuration upon the closure member as line pressures increase.

The illustrative embodiments described in the foregoing specification demonstrate but a few of the structural variations possible within the inventive concept. The means for attaching the valve of the invention to the input and output lines through which materials flow may be varied to suit the particular situation without departing from the scope of the invention. Spider configuration and location may also be varied.

The variation in closure member wall strength has been illustrated as accomplished by ribs or thickened portions. Internal or external radial grooves may also be used to vary the strength circumferentially of the wall defined by the exterior and interior surfaces of the closure member. Semi-rigid or rigid inserts may also be molded into the closure member wall to increase the strength of selected areas thereof without changing the configuration of the closure member.

We claim:
1. A unidirectional valve comprising a valve body, a flow passage through the valve body; a portion of said flow passage defining a valve seat; a resilient closure member supported within the flow passage and adapted to make contact with the periphery of said valve seat to preclude flow of materials in one direction through the flow passage, said closure member having exterior and interior wall surfaces extending outwardly from the central axis of the flow passage in the direction of normal line flow, the periphery of said wall surfaces being unsupported and extending beyond the periphery of said valve seat into a portion of said flow passage having a larger diameter than the major diameter of said closure member, the material between exterior and interior wall surfaces varying such that the closure member's resistance to compression differs at differing peripheral points on the closure member; and resilient means connected to said closure member affording displacement of said closure member from said valve seat.

2. A unidirectional valve comprising a valve body, a flow passage through the valve body, a valve seat defined by a part of the periphery of the flow passage, a closure member mount within the flow passage, a resilient closure member supported by the mount within the flow passage, said closure member having substantially concentric exterior and interior frusto-conical wall surfaces extending outwardly from the point of support of the closure member on the mount in the direction of normal line flow, the closure member being adapted to change its exterior configuration under normal line pressure to displace its major diameter inwardly from the flow passage periphery to permit flow of materials through the flow passage, said major diameter being adapted normally to engage said valve seat under conditions of no line flow and back pressure, and to additionally extend in an unsupported condition beyond said valve seat into a portion of said flow passage having a larger diameter than said major diameter of said closure member under conditions of line flow, and resilient means connecting between the closure member and the closure member mount affording displacement of the closure member from the valve seat.

3. A valve in accordance with claim 2 wherein the material thickness between exterior and interior surfaces varies circumferentially to define spaced radial closure member ribs.

4. A unidirectional valve comprising a valve body, a flow passage through the valve body, a substantially conical resilient closure member having means for causing flexure of said closure member in a predetermined pattern, a closure member mount within the flow passage, a valve seat portion of the flow passage adapted for sealing contact with the closure member so as to preclude flow in one direction through the flow passage, back-up means in the flow passage adapted to support the closure member under back pressure, the outer configuration of the closure member and the member contacting configuration of the back-up means in the flow passage differing to a degree to cause the outer edge of the closure member to migrate upstream with respect to the valve seat in contact therewith as back pressure varies the thrust of the closure member against said back-up means, and resilient means connecting between the closure member and the member mount affording displacement of the closure member from the valve seat.

5. A valve in accordance with claim 4 wherein the means affording displacement further comprises a support shaft held by the back-up means and supporting the closure member.

6. A valve in accordance with claim 5 wherein the support shaft and the resilient means are largely surrounded by the hollow closure member.

7. A unidirectional valve in accordance with claim 4 wherein said means affording displacement includes means causing nonuniform displacement of the closure member from the valve seat under normal flow so as to inhibit flutter of the closure member.

8. A valve in accordance with claim 7 wherein said means for causing nonuniform displacement comprises downstream supports depending from the body.

9. A valve in accordance with claim 4 further comprising a flow passage portion adjacent the valve seat portion downstream thereof, said flow passage portion having a diameter in excess of the normal major diameter of the conical closure member such that radial elongation of the resilient closure member under flow conditions is unimpeded.

References Cited
UNITED STATES PATENTS

| 2,008,818 | 7/1935 | Corbett | 137—525.3 X |
|---|---|---|---|
| 2,627,874 | 2/1953 | Johnson | 251—5 |
| 2,641,282 | 6/1953 | Hazlett | 251—5 |
| 2,912,999 | 11/1959 | Kersh | 137—512.4 |
| 2,936,779 | 5/1960 | Kindred | 137—525 |
| 2,946,342 | 7/1960 | Dopplmaier | 137—525 X |
| 2,949,930 | 8/1960 | Moore et al. | 137—516.29 |
| 3,022,796 | 2/1962 | Cummings | 137—525 X |
| 3,122,156 | 2/1964 | Kersh | 137—525.3 X |

WILLIAM F. O'DEA, Primary Examiner

D. J. ZOBKIW, Assistant Examiner

U.S. Cl. X.R.

137—516.25, 536, 541, 543